Dec. 28, 1948.  E. C. KLEPP  2,457,685
MOVING-COIL ELECTRIC INSTRUMENT
Filed Feb. 23, 1944

INVENTOR
Edwin C. Klepp
By Watson, Cole, Grindle & Watson

Patented Dec. 28, 1948

2,457,685

UNITED STATES PATENT OFFICE 2,457,685

MOVING-COIL ELECTRIC INSTRUMENT

Edwin Claude Klepp, London, England, assignor to S. Smith & Sons (England) Limited, a British company Application February 23, 1944, Serial No. 523,608
In Great Britain November 2, 1942

8 Claims. (Cl. 171—95)

This invention relates to moving-coil electric instruments of the kind comprising two coils mounted to rotate in a magnetic field and wound to produce opposing torques when connected to a source of supply, the response of the instrument being dependent upon the result of the two torques.

It is known to use instruments of this kind as a difference meter by arranging the coils in a magnetic field of uniform intensity so that the resultant torque is proportional to the difference of the currents in the two coils, and in such an arrangement a biasing spring is required in order that the deflection of the coils against the bias may be a measure of the resultant torque and therefore of the current difference.

It has been proposed in my United States applications Serial No. 438,329, filed April 9, 1942, now Patent No. 2,357,524, of September 5, 1944, and Serial No. 489,419, filed June 2, 1943, now Patent No. 2,400,308, of May 14, 1946, to modify such an instrument to operate as a ratiometer by providing a graded field for the coils and by arranging stretches of the two coils to lie in different parts of a field, thereby enabling the biasing spring to be dispensed with since the coils take up a position of zero resultant torque which is dependent on the ratio of the currents in the two coils. The grading of the field was produced in the one case by providing a gap of varying width through which the coils moved and in the other case by arranging that different lengths of the coils were influenced by the field according to their position in it. The present invention is directed towards providing a graded field in an arrangement of the above kind in an improved manner.

According to this invention, a moving-coil electric instrument of the kind referred to above is characterised in that certain stretches of the coils are arranged to move in a gap of substantially constant width along their path of movement, which gap is formed between a core and a magnet pole, and the cross-section of which core and/or of the magnet pole is so selected that a part of the core and/or magnet pole facing the gap approaches saturation, whereby the field strength in the gap decreases along the path of movement away from this part, which core is encircled by both coils. Preferably, the core and/or magnet pole is so constructed that it has the same order of reluctance as the air gap between it and the pole face, this being done by suitable choice of dimensions for the air gap and the core and/or pole piece. The core and/or magnet pole may be formed from a metal alloy, the permeability of which varies in accordance with a predetermined law so as to be comparatively high at low flux densities and low at high flux densities. By this means, the required rate of change of field strength along the core may be obtained.

In one construction the core is arranged in the field between two pole pieces so that stretches of the coils on both sides thereof are arranged in a magnetic field.

The required cross-section of the core may be provided by making it hollow. For example, the core may comprise a cylindrical annulus which is arranged in a cylindrical space formed between the pole faces of a magnet, the axis of which annulus is arranged to be coaxial with the cylindrical face, and the end stretches of the coils are arranged to extend across the ends of the core where they cross one another, and which coils are mounted to rotate about an axis coaxial with that of the annulus.

In an alternative arrangement, both coils are arranged to encircle an annulus so that the side stretches of the coils pass through the centre passage of the annulus over the end faces on one side of the annulus and axially along the outer face thereof, which coils are mounted to swing about the axis of the annulus, and which annulus on one side of the gap is coupled to or formed as a continuation of one pole of the magnet, while the face of the other pole is arranged opposite a face of the annulus so as to provide a gap of constant width in which stretches of the two coils move. The gap of constant width may, for example, be formed between a flat end face of said annulus and a flat pole piece arranged opposite it.

The part of the core which is coupled to or forms a continuation of the pole piece, is provided with a cross-sectional area which results in the saturation point being reached, and thus the field strength in the gap adjacent this part of the core will be a maximum, and the field strength falls off along the gap as the flux is distributed. As indicated above, an alloy may be selected for the core, the permeability of which varies between low and high values, and by this means, the rate of change of field strength along the gap is still further influenced.

The following is a description of two alternative forms of the invention, reference being made to the accompanying diagrammatic drawings, in which.

Figure 1:
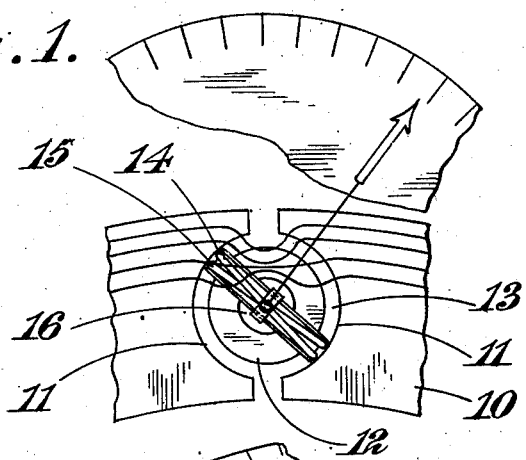
Figure 1 is a diagrammatic plan view of an arrangement in which a core is disposed between two pole faces so as to provide the required varying field strengths.

In the construction shown in Figure 1, the apparatus comprises a circular horseshoe magnet 10, the opposed pole faces 11 of which are arranged to provide between them a cylindrical space. Mounted in this cylindrical space is a core 12 in the form of a cylindrical annulus, arranged with its axis coaxial with that of the cylindrical space, thereby providing a gap 13 of constant radial width. Encircling the core are two coils 14 and 15 which are wound upon a former 16 mounted to rotate about an axis coaxial with those of the core and the space between the pole faces. As will be seen, the two coils cross one another over the ends of the core and intersect on the aforesaid axis. The cross-section of the core is such that the flux flowing through it from the magnet pole faces causes saturation at diametrically opposite points of the core lying in the diametric plane dividing the magnet poles; the flux, therefore, tends to accumulate at those parts of the air gap that are adjacent to the saturated parts of the core. The flux in the air gap is therefore graded so that it is a maximum near the outer edges of the magnet poles and a minimum at the centre of the poles. The grading of the flux is indicated on Figure 1 by the spacing of the lines which represent the magnetic lines of force.

Figure 2:
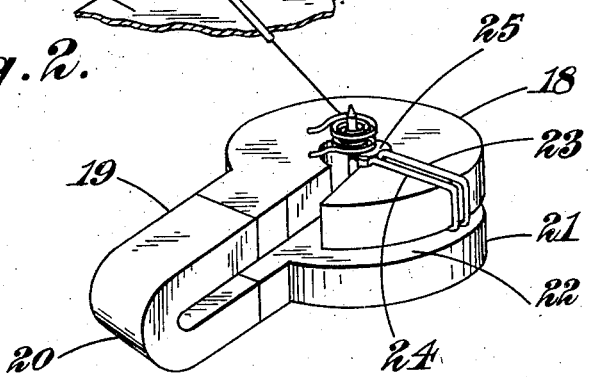
Figure 2 is a diagrammatic perspective view of the invention as applied to a second arrangement.

It will thus be seen that a grading of the flux is obtained which is substantially the same as that produced in the arrangement shown in Figure 2 of the complete specification of application Serial No. 438,329, by providing a variable width air gap.

The operation of the instrument is substantially the same as that described in applicant's Patents 2,357,524 and 2,400,308, but the simple shape of the core and the constant width air gap result in a construction which is more convenient for many purposes.

Figure 3:
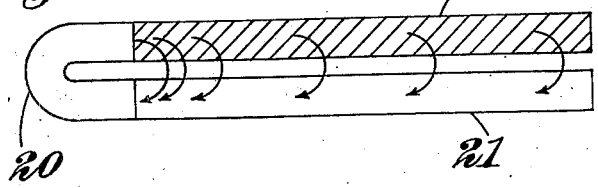
Figure 3 is a diagrammatic view showing a development of the annular core and associated pole piece showing how the field strength varies along the length of the gap.
Figure 4:
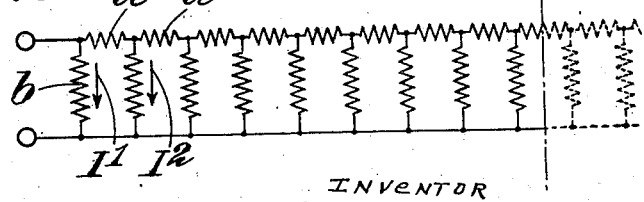
Figure 4 shows a resistance network analogous to the magnetic system of Figures 2 and 3.

In the second arrangement shown in Figure 2, the core 18 comprises a gapped annulus and is in direct contact with one pole 19 of a horseshoe magnet 20. The other end of the horseshoe magnet is either provided with a continuation or abuts a disc-shaped pole-piece 21 arranged parallel with a face of the gapped annulus, thereby providing a constant-width gap 22. The gapped annulus is encircled by the two coils 23 and 24, which pass through the central opening of the annulus across the two flat faces and axially across its periphery. The main purpose of the gap is to facilitate the assemblage of the coils, otherwise the annulus could be continuous. The coils are carried by a mounting 25 which is arranged to swing about the axis of the annulus. Since only one side of the coils pass through a magnetic gap, no cross-over is required as in Figure 1. The cross-sectional area of the core and/or of the pole-piece 21 along the path of movement of the coils is so selected that saturation point takes place in one or the other of these parts, adjacent the magnet proper, whereas the flux density diminishes along the path of movement. The distribution of flux along the path is indicated in Figure 3 by the spacing apart of the arrows. An electrical equivalent of the magnet system is shown in Figure 4 which is made up of an electrical resistance ladder network. The resistances $a_1$, $a_2$, etc., represent the reluctance of the various sections of the pole-piece 21, and the resistances $b$, the reluctance of the air gap. Assuming a voltage (representing the magnetising force) is applied to one end of the network there will be a falling off of potential between the two sides of the network along the length thereof, and thus the current $I_1$, $I_2$ etc. (equivalent of field strength) flowing through the various cross-resistances $b$ will be graded along the length of the network.

If the values of the resistances $a_1$, $a_2$, etc., are arranged to increase with the values of the current being passed, the attenuation of the voltage between the two sides of the network and the grading of the current through the resistances $b$ would become still more pronounced. This is in effect what takes place when a suitable alloy is selected for the core 18 and/or pole-piece 21, so that the permeability decreases in accordance with a suitable law from a very high figure at low flux density, to a low figure at high flux density.

I claim:

1. A moving coil electric instrument of the class described comprising, in combination, two elements formed of magnetic material and spaced apart to provide a gap between them, one of said elements comprising at least one pole of a magnet and the other a core member, two concentrically arranged coils encircling said core member and mounted to rotate together in the same magnetic field, certain stretches of the coils disposed so as to move in said gap, said gap being of substantially constant width along the path of movement of the coils, the cross section of at least one of said elements being such that a part of one of them which faces said gap approaches magnetic saturation, whereby the field strength in the gap decreases along the path of movement of said coil stretches, in a direction away from said part.

2. A moving coil electric instrument according to claim 1, wherein at least one of said elements has the same order of reluctance as the air gap between the core and the magnet pole.

3. A moving coil electric instrument according to claim 1, wherein at least one of said elements is formed from a metal alloy the permeability of which varies in accordance with a predetermined law so as to be comparatively high at low flux densities and comparatively low at high flux densities.

4. A moving coil electric instrument according to claim 1, wherein one of the elements comprising two pole pieces and said core is arranged in the field between two pole pieces, and stretches of the coils on both sides thereof are arranged in the magnetic field between the pole pieces and the core.

5. A moving coil electric instrument according to claim 1, wherein the core is a cylindrical annulus.

6. A moving coil electric instrument according to claim 1, wherein said magnet has two pole faces and said core is a cylindrical annulus and is arranged in a cylindrical space formed between the pole faces of the magnet, the axis of which annulus is coaxial with the cylindrical space, and wherein the end stretches of the respective coils extend across the ends of the core and cross one another, which coils are mounted to rotate about an axis coaxial with that of the annulus.

7. A moving coil electric instrument according to claim 1, wherein said core is a cylindrical annulus and both coils encircle said annulus so that side stretches of the coils pass up through the centre passage of the annulus, which coils are mounted to swing about the axis of the annulus, which annulus on one side of the gap forms a continuation of one pole of the magnet, while the face of the other pole is arranged opposite a face of the annulus so as to provide a gap of constant width in which stretches of the two coils move.

8. A moving coil electric instrument according to claim 1, wherein said core is a cylindrical annulus having a flat end facing said pole piece also having a flat face arranged opposite said face of the annulus, and said gap of constant width is formed between said faces.

EDWIN CLAUDE KLEPP.

REFERENCES CITED

The following references are of record in the file of this patent:

UNITED STATES PATENTS

| Number | Name | Date |
|---|---|---|
| 1,125,711 | Record | Jan. 19, 1915 |
| 1,165,745 | Benecke | Dec. 28, 1915 |
| 1,550,240 | Browne | Apr. 18, 1925 |
| 1,624,135 | Foster | Apr. 12, 1927 |
| 1,918,023 | Faus | July 11, 1933 |
| 1,985,082 | Faus | Dec. 18, 1934 |
| 2,097,036 | Mori | Oct. 26, 1937 |

FOREIGN PATENTS

| Number | Country | Date |
|---|---|---|
| 486,695 | Great Britain | June 9, 1938 |
| 489,022 | Great Britain | Oct. 15, 1936 |
| 561,095 | Germany | Oct. 10, 1932 |
| 561,866 | Great Britain | June 8, 1944 |
| 638,192 | Germany | Nov. 11, 1936 |